READBACK CIRCUITS FOR INFORMATION STORAGE SYSTEMS

Filed March 3, 1965 2 Sheets-Sheet 1

INVENTORS
GEORGE V. JACOBY &
JOSEPH D. GLEITMAN
BY John V. Regan
Attorney

READBACK CIRCUITS FOR INFORMATION STORAGE SYSTEMS

Filed March 3, 1965 2 Sheets-Sheet 2

INVENTORS
GEORGE V. JACOBY &
JOSEPH D. GLEITMAN
BY John V. Regan
Attorney

United States Patent Office 3,405,403

Patented Oct. 8, 1968

3,405,403
READBACK CIRCUITS FOR INFORMATION STORAGE SYSTEMS

George V. Jacoby, Bala-Cynwyd, Pa., and Joseph D. Gleitman, Camden, N.J., assignors to Radio Corporation of America, a corporation of Delaware Filed Mar. 3, 1965, Ser. No. 436,764
6 Claims. (Cl. 340—174.1)

ABSTRACT OF THE DISCLOSURE

A readback circuit provides phase and amplitude compensated readback signals. The readback circuit boosts the amplitude of the frequency components in the readback signal up to a desired cut-off frequency, so as to provide a substantially linear amplitude response up to the cut-off frequency. The readback circuit also phase shifts the readback signal so as to provide an overall phase shifting that is substantially quadrantal.

This invention relates to readback circuits for information storage systems and, more particularly, relates to readback circuits which equalize the readback signal.

One type of recording signal which is frequently utilized when it is desired to densely pack binary information on a polarizable storage medium (e.g., magnetic or dielectric tapes, drums, etc.) is phase modulation recording. In this type of recording, two rectangular recording levels of write current of opposite polarity are used to record each binary information bit. A binary "1" is recorded by applying a first recording level to polarize the medium in one direction and then a second recording level to polarize the medium in the opposite direction. Similarly, a binary "0" is recorded by applying a first recording level to polarize the medium in the said opposite direction and then a second recording level to polarize the medium in the said one direction. With this type of recording each bit cell in the storage medium is polarized in two opposite directions with a change in direction or transition in polarization occurring at the approximate center of the cell. A transition in polarization also occurs at the end of each cell when a successive of binary "1's" (or binary "0's") are recorded, but no transition occurs when a binary "1" is recorded immediately after a binary "0" and vice versa. During readback, a readback pulse is produced by each transition in polarization and therefore each transition that stores an information bit produces a pulse. The polarity of the pulses denotes the binary value of the stored information bits.

The full advantage of phase modulation recording is not obtained unless the inherent timing contained in the readback signal is utilized. The peaks of the bipolar pulses in the readback signal are inherently synchronized with the transfer of the binary information from the storage medium and may be utilized to generate clock pulses in synchronism with this transfer. The generation of such a self-synchronizing clock signal avoids the necessity of providing either a timing track on the storage medium or an external clock signal generator.

A problem does arise, however, in generating a self-synchronizing clock signal from the readback signal because of the frequency response of the reading heads. In the frequency range of interest, the reading heads attenuate the higher frequencies more than the lower frequencies and also quadrantally shift the phase of all the frequencies in the readback signal. Such distortion causes a severe problem at extremely high packing densities because the higher frequencies in the readback signal are attenuated to the point where susbtantially no peaks occur. No reliable clock signal can be generated from such a distorted signal. Techniques have been disclosed that eliminate such distortion by utilizing resonant networks that narrow the pulses and shift back the phase of the readback signal. However, such networks are exceedingly complex and hence relatively unreliable and expensive.

Accordingly, it is an object of this invention to provide a simplified readback circuit for information storage systems.

It is another object of this invention to provide a readback circuit which equalizes the readback signal so as to permit the inherent timing information therein to be extracted from the signal.

A readback circuit in accordance with the invention provides an equalized readback signal which is a sufficiently adequate reproduction of the initial rectangular recording signal to permit an accurate timing signal to be extracted. Such a substantial reproduction is obtained by boosting the higher frequencies in the original unequalized readback signal and phase shifting by ninety degrees the frequencies of interest in this signal. The readback circuit utilizes a lead network to substantially accomplish both of these functions simultaneously and therefore provides a reliable and inexpensive circuit in contrast to prior art techniques.

In the drawings:

FIGURE 3 is a graph illustrating the frequency response of the reading heads utilized in the readback circuit of FIGURE 1;

Figure 1:
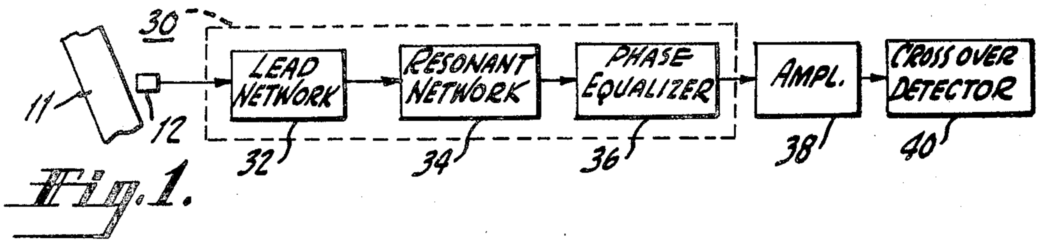
FIGURE 1 is a block diagram of a readback circuit in accordance with the invention.
Figures 4A, 4B:
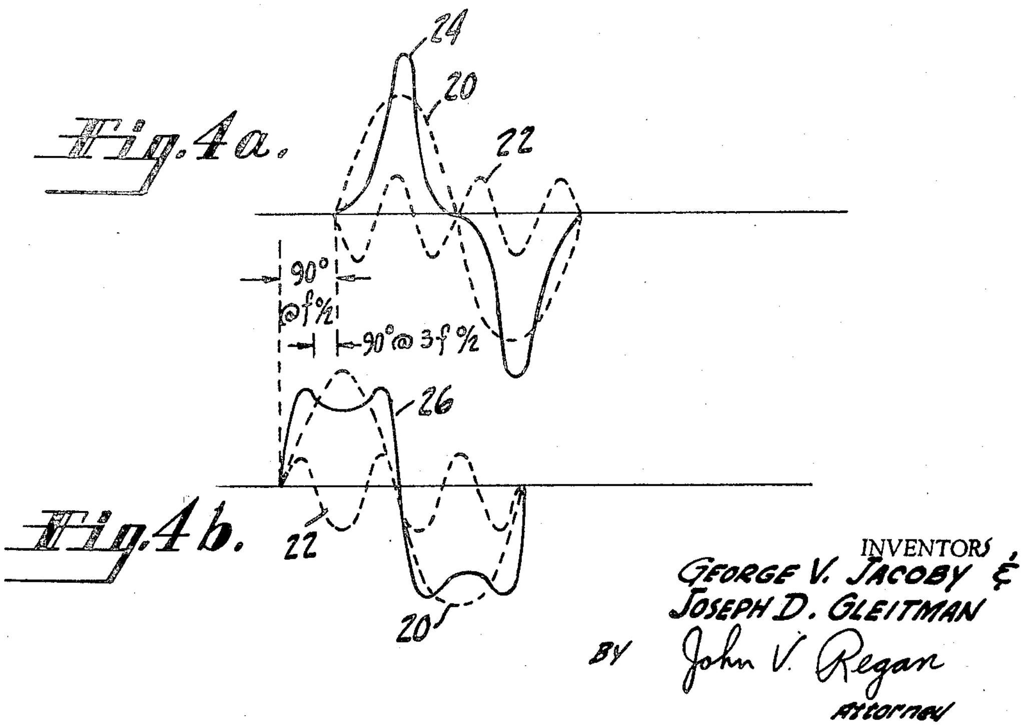
Figure 6:
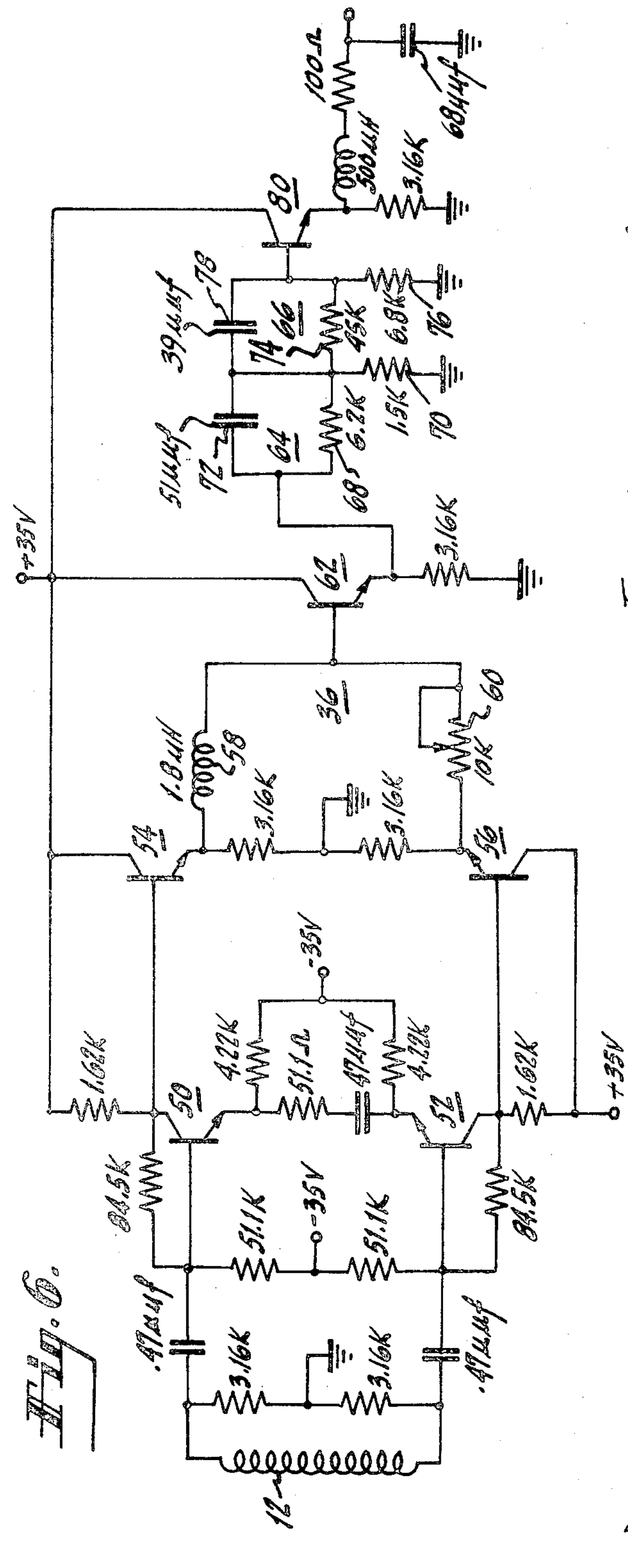
Figure 7:
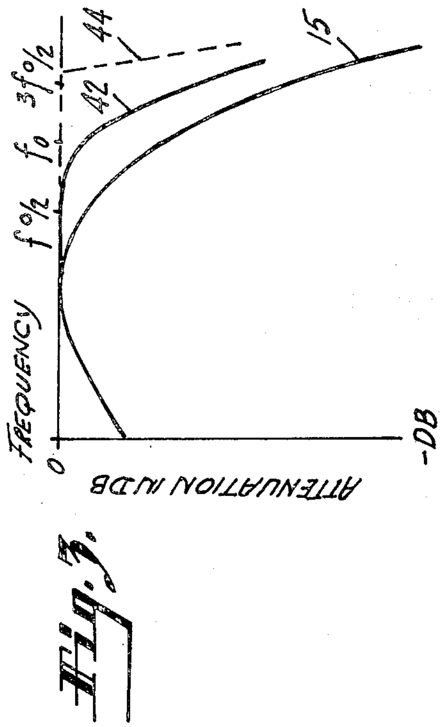
Figure 5:
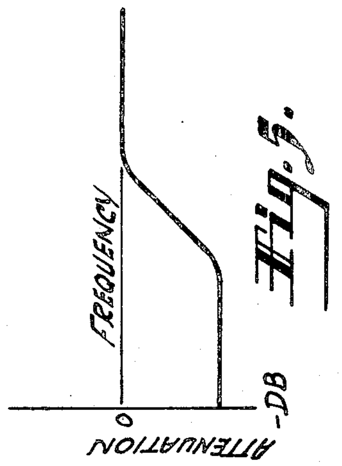

FIGURES 4*a* and 4*b* are graphs illustrating the distortion in the readback signal due to the inherent phase shift produced by the reading heads in the readback circuit of FIGURE 1; FIGURE 4*a* shows the resultant wave when the third harmonic is out of phase with the fundamental wave. FIGURE 4*b* shows the resultant wave when both the fundamental wave and the third harmonic are phase shifted by 90°;

FIGURE 5 is a graph illustrating the frequency response of a lead network utilized in the readback circuit of FIGURE 1; and FIGURE 6 is a detailed schematic circuit diagram of a readback circuit in accordance with the invention.

Figure 2:
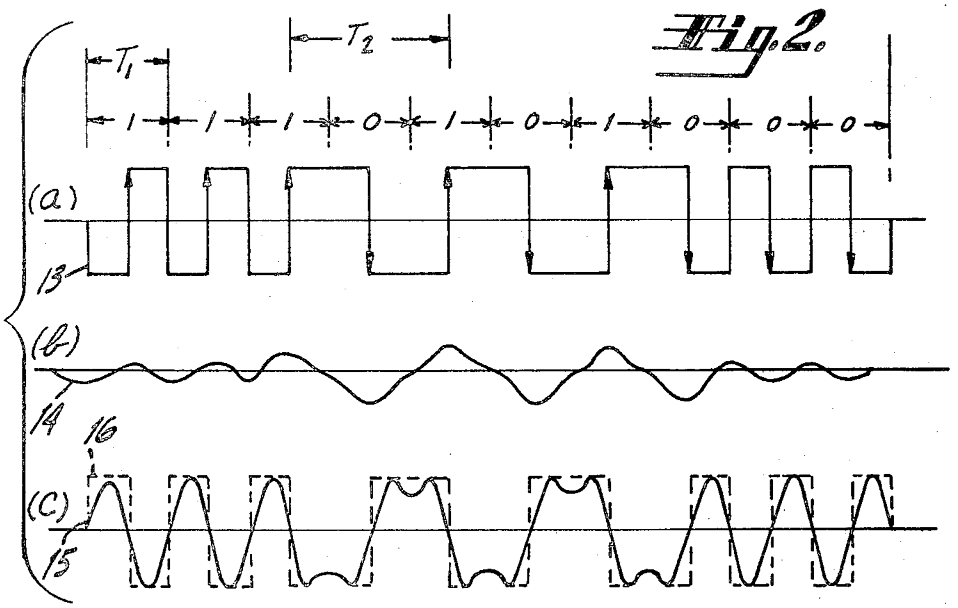
FIGURE 2 is a series of graphs, somewhat idealized, that depict the various waveforms that occur at various points in the readback circuit of FIGURE 1.

In FIGURE 1, there is shown a readback circuit 10 that equalizes the readback signal so as to permit extracting an accurate self-synchronizing clock signal therefrom. The readback circuit 10 includes a polarizable storage medium 11 which may, for example, be of the dielectric or magnetic type and may consist of a drum, a tape, etc. For the purposes of this specification, it will be assumed that the polarizable storage medium 11 is a tape that is coated with a magnetic material. The information stored on the tape 11 is read out by means of a magnetic transducer or reading head 12. The information to be read from the magnetic tape 11 may be recorded thereon by a phase modulated recording signal 13, such as that shown in line *a* of FIGURE 2. It is assumed that the binary data stored on the tape 11 by the recording signal 13 comprises the sequence 1110101000 as shown in FIGURE 2. It is to be noted that each information bit is recorded by two opposite polarity recording levels. To record a binary "1," a first negative recording level is applied to polarize the tape 11 in one direction and a second positive recording level is applied to polarize the tape 11 in the opposite direction. An opposite sequence of recording levels is utilized to record a binary "0." Consequently, a bit cell in which a binary "1" is recorded exhibits a negative to a positive transition in polarization.

Such a transition is represented in FIGURE 2 by an arrowhead pointed to the top of the figure. A bit cell in which a binary "0" is recorded exhibits a positive to a negative transition in polarization. Such a transition is represented by an arrowhead pointed to the bottom of FIGURE 2.

In the recorded signal 13, a succession of binary "1's" or "0's" exhibit a period $T_1$ which is one-half that of the period $T_2$ exhibited by a series of 0 to 1 or 1 to 0 transitions. This is because a succession of "1's" or "0's" requires that the signal 13 return to the same point to record an identical signal whereas the 0 to 1 transitions do not. Thus, the recording signal 13 is essentially a two period or two frequency squarewave signal. The fundamental frequency of the squarewave of the period $T_1$ is designated $f_o$ and the fundamental frequency of the squarewave of the period $T_2$ is one-half that of $f_o$ or $f_o/2$. Information is read out of the tape 11 at the frequency rate $f_o$ and it is desired to generate a clock signal at this frequency to provide a timing signal to transfer the binary information at the correct rate.

In read out, the relative motion between the magnetized tape 11 and the read heads 12 induces a readback voltage in the read head 12. At high packing density, the readback signal may be similar to the signal 14 in line *b* of FIGURE 2. The readback signal 14 is severely distorted and the peaks of this waveform are not sufficiently sharp or distinct enough to generate uniform and regularly occurring timing pulses therefrom.

The distortions in the waveform 14 occur at high packing density because the finite size of the read head 12 causes it to intercept flux patterns from adjacent bit cells. These flux patterns interact to such an extent that cancellation almost occurs at the higher frequency $f_o$.

The attenuation versus frequency response of the read head 12 is shown by the curve 15 in FIGURE 3. It is to be noted from the response curve 15 that the higher frequencies in the readback signal are attenuated more than the lower frequencies in the frequency range of interest. Consequently, the portion of the readback signal 14 that is derived from the higher frequency $f_o$ in the recorded signal 13 exhibits a much smaller amplitude than that portion derived from the lower frequency $f_o/2$. Additionally, the readback signal 14 is phase shifted by 90° due to the inherent differentiation in the readback process. If the distorted signal 14 is merely differentiated to produce timing pulses directly from this distorted waveform, then no accurate timing signal will result because of the unequal spacings in the signal 14. Furthermore, no reliable digital information can be extracted from the more severely attenuated portions of this signal.

A readback circuit in accordance with the invention converts the readback signal 14 into a substantial reproduction of the recorded signal 13 so that the reliable zero crossovers therein may be utilized to generate an accurate timing signal. The invention makes use of the fact that a squarewave signal may be considered to comprise a sinewave of a fundamental frequency as well as additional sinewaves of odd harmonics of the fundamental. An analysis of the distorted readback signal 14 discloses that it contains a severely attenuated sinewave of frequency $f_o$. This portion of the readback signal 14 corresponds to the squarewave signal of the period $T_1$ that occurs due to the series of binary "1's" or "0's" in the recording signal 13. Similarly, the signal 14 also contains a slightly attenuated sinewave of frequency $f_o/2$ as well as a heavily attenuated third harmonic signal $3f_o/2$. The sum of the fundamental frequency $f_o/2$ signal and third harmonic $3f_o/2$ signal corresponds to the squarewave portion in the recording signal 13 of the period $T_2$ resulting from the 0 to 1 transitions. To provide a substantial replica of the recording signal 13 for timing purposes, it is not necessary to duplicate all of the frequencies that are contained in the original squarewave signal.

It was found that the slope at the zero crossover of a sinewave signal of amplitude A and frequency $f_o$ equaled the slope at the zero crossover of a composite signal composed of the sum of a sinewave signal of amplitude A and frequency $f_o/2$ and a third harmonic signal of amplitude $A/3$ and frequency $3f_o/2$. Since the slopes of the two signals are equal, no discontinuity appears at their transitions and consequently the zero crossovers are accurately located. Such a reproduced signal is illustrated by the equalized readback signal 15 in line *c* of FIGURE 2. A mirror image 16 of the initial recording signal is shown super-imposed in dotted form on the signal 15 to illustrate the coincidence of the zero crossovers in both signals. The readback signal 15 is equalized about the zero axis thereof and therefore the zero crossovers do not shift when this signal is processed further.

To convert the distorted signal 14 into an equalized signal, the signal 14 must be phase shifted as well as boosted. To illustrate the significance of the phase shifting aspect of equalizing the signal, reference is made to FIGURE 4. FIGURE 4*a* shows a fundamental sinewave 20 of frequency $f_o/2$ and a third harmonic wave 22 of frequency $3f_o/2$. The third harmonic 22 is out of phase with the fundamental wave 20. The sum of the two waves provides a resultant wave 24, which, it is to be noted, resembles the portions of the readback signal 14 in line *b* of FIGURE 2 derived from the period $T_2$ in the intial recording signal 13. In FIGURE 4*b* the relationship of the two waves 20 and 22 are shown when they are both phase shifted by 90°. A quadrantal phase shift of the fundamental wave 20 results in a greater displacement than a quadrantal phase shift of the third harmonic 22. The result of such a phase shift is that both the fundamental 20 and third harmonic 22 waves are now in the proper and add up to the resultant wave 28. The resultant wave 28 is a substantial reproduction of a squarewave when only the fundamental and third harmonic components are present and the third harmonic amplitude is one-third the amplitude of the fundamental. In order to provide such a substantial replica of the input waveform, both the high and the low frequency components of the waveform must be equalized.

To provide an equalized waveform, the magnetic head 12 in FIGURE 1 is coupled to an equalizer circuit 30. The equalizer network 30 includes a phase lead network 32 that simultaneously introduces a positive phase shift increasing up to 90° at the higher frequencies and boosts the higher frequencies relative to the lower frequencies in the readback signal 14. A resonant circuit 34 is connected to the lead network 32 to provide a further boost for the higher frequencies in the frequency range of interest, as will be described more fully subsequently. A phase equalizer 36 is coupled to the resonant network 34 to introduce a phase shift to compensate for any undesirable phase shifting that occurs in the readback circuit. An amplifier 38 is coupled to the equalizer 30 to amplify the equalized waveform 15 (FIGURE 2) to an amplitude sufficient to make the "0" crossovers in the equalized signal almost vertical. A crossover detector 40 is coupled to the amplifier 38 to extract sharp timing pulses from each nearly vertical "0" crossover in the amplified and equalized readback signal. Such a string of pulses are utilized as a self-synchronizing clock signal when the extraneous pulses therein are suppressed.

The readback circuit 10 of FIGURE 1 is designed to convert the distorted readback signal 14 of line *b*, FIGURE 2, into the equalized readback signal 15 of line *c* of FIGURE 2. The equalized readback signal 15 is a substantial replica of the initial recording signal 13, line *a* of FIGURE 2, albeit a mirror image of this signal. A mirror image is satisfactory because binary data is read from the tape 11. Since it is binary data, there is no disadvantage in providing a readback signal 180° out of phase with the intial recording signal. A mirror image of the signal 13 is easier to provide than an exact reproduction because there is an inherent leading 90° phase shift introduced during readout into the readback signal 14 by the magnetic transducer head 12. To provide an exact reproduction of the initial recording signal 13 would require the shifting of the phase of the readback signal back 90°. It is simpler and less expensive to introduce an additional leading 90° phase shift into the readback signal because such a quadrantal phase shift is readily provided by a phase lead network. A phase lead network not only provides the necessary 90° leading phase shift but also simultaneously provides a boost for the higher frequencies in the readback signal.

Phase lead networks are described fully in the book entitled "Servomechanisms" by Thaler and Brown, McGraw-Hill, 1953, page 199 et seq. Briefly, a phase lead network operates in the manner of a high pass filter that passes (or boosts) higher frequency signals with little attenuation and introduces a leading phase shift into these frequecies. A typical frequency response of a phase lead network is shown in FIGURE 5. The phase lead network 34 therefore effectively performs the simultaneous functions of substantially quadrantally shifting the phase as well as boosting the higher frequencies of the readback signal. Thus, the phase lead network effectively converts the frequency response curve 15 in FIGURE 3 into the frequency response curve 42 in this figure. The phase lead network also shifts the waveforms in FIGURE 4*a* into the phase relation shown in 4*b*.

The effective altering of the frequency response curve 15 in FIGURE 3 into a flat response (i.e., 0 db attenuation) is what is necessary to reproduce the initial squarewave. Obviously, the fundamental and odd harmonics occur in the right proportions in the original signal and will be reproduced if the frequency response curve is flat. However, the phase lead network 32 does not completely compensate for the curve 15 near the third harmonic component of frequency $3f_o/2$ because of the steep slope of the curve 15 at this frequency. Consequently, the resonant circuit 34 is added to provide the necessary boost for the higher frequencies up to the third harmonic frequency $3f_o/2$. The fully compensated curve 44 is shown dotted in FIGURE 3. The response of the reading head 12 is therefore effectively altered by the equalizer network 30 to provide a substantially flat response up to the third harmonic frequency $3f_o/2$. The response need not be flat above this frequency because the fundamental and third harmonic component are reproduced in their correct amplitude and phase and the sum of these waves effectively simulate the desired squarewave.

Referring now to FIGURE 6, a detailed schematic diagram of the readback circuit 10 is illustrated. Since the readback circuit 10 includes known individual circuits, all of these circuits will not be described in detail. However, the various circuit values of the components therein are given in the drawing. The read head or magnetic transducer 12 provides a pair of oppositely phased readback signals at the end terminals thereof. The signals from the pickup head 12 are amplified by a difference amplifier composed of stages 50 and 52. The difference amplifier stages 50 and 52 are coupled, respectively, through isolating emitter followers 54 and 56 to a phase equalizer 36. The phase equalizer 36 comprises an inductor 58 and a variable resistor 60 serially coupled between the output terminals of the emitter followers 54 and 56. The phase equalizer 36 introduces a phase shift into all the frequencies of interest in the readback signal to compensate for the undesirable phase shift that occurs in the readback circuit. It is to be noted that the order of the connections of the equalizer circuit in FIGURE 6 differs from the order in FIGURE 1 but the same equalized signal results from both circuits regardless of this order. The order is different because the double ended or oppositely phased signals provided by the magnetic reading head 12 permits the simple R-L phase equalizer circuit 36 to be utilized.

The junction of the inductor 58 and resistor 60 comprises the output terminal of the phase equalizer 36 and this terminal is coupled through an isolating emitter follower 62 to a lead network 32. The lead network 32 comprises two phase lead circuits 64 and 66. Two phase lead circuits 64 and 66 are required because the range and phase shift available from one phase lead circuit is not sufficient to provide the phase shift and boost required to convert the response curve 15 in FIGURE 3 into the response curve 42. The lead network comprises a pair of serially connected resistors 68 and 70 connected from the output terminal of the emitter follower 62 to circuit ground. A capacitor 72 is shunted across the resistor 68. The junction of the resistors 68 and 70 comprises an output terminal for the lead network 64 and the output terminal is connected to the second lead network 66. The second lead network 66 also comprises a pair of resistors 74 and 76 coupled in series between the output terminal of the lead network 64 and circuit ground. A capacitor 78 is also shunted across the resistor 74. The phase shifted and boosted readback signal from the lead network 32 is coupled through an isolating emitter follower 80 to the resonant network 34. The resonant network 34 includes the series combination of an inductor 82, a resistor 84 and a capacitor 86, all coupled in series in the order named between the output terminal of the emitter follower 80 and circuit ground. The resonant circuit 34 is tuned to a frequency somewhat higher than $3f_o/2$. The junction of the resistor 84 and capacitor 64 provides an output terminal for the equalizer circuit. For convenience, the details of the amplifier 38 and the crossover detector 40 are not shown.

In operation, the distorted readback signal picked up by the head 12 is amplified in the differential amplifier stages 50 and 52 before application to the phase equalizer 36. The phase equalizer 36 introduces a phase shift which compensates for any adverse phase shift in the readback circuit. The readback signal is then boosted and phase shifted 90° in the lead network 32. As shown in FIGURE 3, the lead network 32 improves the frequency response of the circuit to convert the curve 15 to the curve 42. The third harmonic component $3f_o/2$ is not boosted to the desired one-third the amplitude of the fundamental frequency $f_o/2$ so the resonant circuit 34 is added to improve the response curve 42 to that of the curve 44. The resulting equalized readback waveform derived from the output terminal of the readback circuit is a substantial replica of the initial recording signal. Such a waveform is a substantially accurate reproduction of the initial recording signal waveform.

Thus, in accordance with the invention, a readback circuit provides an equalized readback signal by simultaneously boosting and phase shifting the distorted readback signal in a phase lead network. The readback signal is symmetrical about the abscissa or zero axis and provides crossovers substantially identical with the initial recording signal. This permits the extraction of an accurate self-synchronizing signal from the equalizer readback signal.

What is claimed is:

1. A readback circuit for reading back from a polarizable storage medium information data that is recorded by a rectangular recording signal that produces transitions in the directions of polarization of said storage medium, comprising in combination;

means coupled to said storage medium to detect said transitions in polarization to provide a readback signal exhibiting a plurality of frequency components related to the frequency of occurrence of said transitions, means for boosting the amplitude of selected frequency components of said readback signal to provide an overall amplitude response for said readback circuit that is substantially linear up to a desired cut-off frequency, and means for phase shifting said readback signal to provide an overall phase shift that is substantially quadrantal.

2. A readback circuit in accordance with claim 1 wherein said desired cut-off frequency is selected such that said readback signal is converted into a substantial replica of said recording signal.

3. A readback circuit for reading back from a storage medium information data that is recorded by a rectangular recording signal that exhibits first and second periods, comprising in combination, transducing means coupled to said storage medium for providing a readback signal including first and second bipolar portions corresponding respectively to said first and second periods of said recording signal, said first bipolar portion comprising a fundamental wave having a first frequency corresponding to said first period, said second bipolar portion comprising a fundamental wave having a second frequency corresponding to said second period, and higher harmonic components, said transducing means exhibiting a sloping frequency response wherein said fundamental wave of said first frequency as well as higher frequencies are attenuated with respect to said fundamental wave of said second frequency, and means coupled to said transducing means for boosting the amplitude of the higher frequencies in said readback signal to provide a substantially linear frequency response up to the third harmonic of said fundamental wave of said second frequency.

4. The method of removing distortion from an information signal that is recorded on a storage medium by a rectangular recording signal that exhibits first and second periods, comprising the steps of, reading said storage medium to provide a readback signal exhibiting first and second bipolar portions corresponding respectively to said first and second periods, said first bipolar portion comprising a fundamental wave having a first frequency corresponding to said first period, said second bipolar portion comprising a fundamental wave having a second frequency corresponding to said second period, and higher harmonic components, said fundamental wave of said second frequency being out of phase with the third harmonic component thereof, shifting the phase of said readback signal quadrantally so that said third harmonic component is shifted into phase with said fundamental wave of said second frequency to simulate the phasing of said recording signal, and boosting the amplitude of said fundamental wave of said first frequency as well as said third harmonic component of said second frequency to simulate the amplitude of said initial recording signal.

5. A readback circuit for reading back from a storage medium information data that is recorded by a rectangular recording signal that exhibits first and second periods, comprising in combination, transducing means coupled to said storage medium for providing a readback signal including first and second bipolar portions corresponding respectively to said first and second periods of said recording signal, said first bipolar portion comprising a fundamental wave having a first frequency corresponding to said first period, said second bipolar portion comprising a fundamental wave having a second frequency corresponding to said second period, and higher harmonic components, said transducing means exhibiting a sloping frequency response wherein said fundamental wave of said first frequency as well as higher frequencies are attenuated with respect to said fundamental wave of said second frequency, a phase lead network coupled to said transducing means to simultaneously shift the phase of said readback signal by a leading phase up to ninety degrees and to boost the amplitude of said fundamental wave of said first frequency, and a resonant circuit coupled to said phase lead network to boost the amplitude of the third harmonic component of said fundamental wave of said second frequency to provide an equalized readback signal.

6. A readback circuit for reading back from a storage medium information data that is recorded by a rectangular recording signal that exhibits first and second periods, comprising in combination, transducing means coupled to said storage medium for providing a readback signal including first and second bipolar portions corresponding respectively to said first and second periods of said recording signal, said first bipolar portion comprising a fundamental wave having a first frequency corresponding to said first period, said second bipolar portion comprising a fundamental wave having a second frequency corresponding to said second period, and higher harmonic components, said transducing means exhibiting a sloping frequency response wherein said fundamental wave of said first frequency as well as higher frequencies are attenuated with respect to said fundamental wave of said second frequnecy, a phase lead network coupled to said transducing means to simultaneously shift the phase of said readback signal by a leading phase up to ninety degrees and to boost the amplitude of said fundamental wave of said first frequency, a resonant circuit coupled to said phase lead network to boost the amplitude of the third harmonic component of said fundamental wave of said second frequency to provide an equalized readback signal, and a crossover detector coupled to said resonant circuit to provide timing pulses from said equalized readback signal.

References Cited

FOREIGN PATENTS 207,454 4/1957 Australia.

BERNARD KONICK, *Primary Examiner.*

B. HALEY, *Assistant Examiner.*